INVENTORS.
William E. Schroeder
Herman F. Holl
BY
THEIR ATTORNEYS

Oct. 17, 1967  W. E. SCHROEDER ETAL  3,347,094
HYDRAULIC CIRCUIT TESTER
Filed Oct. 22, 1965  3 Sheets-Sheet 2
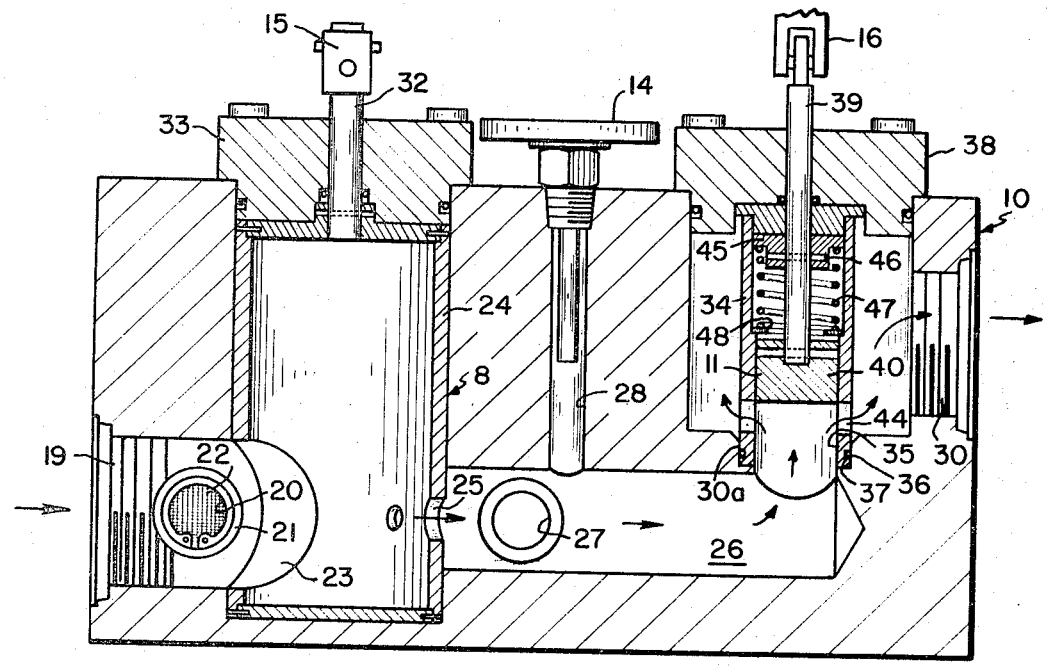
Fig. 3
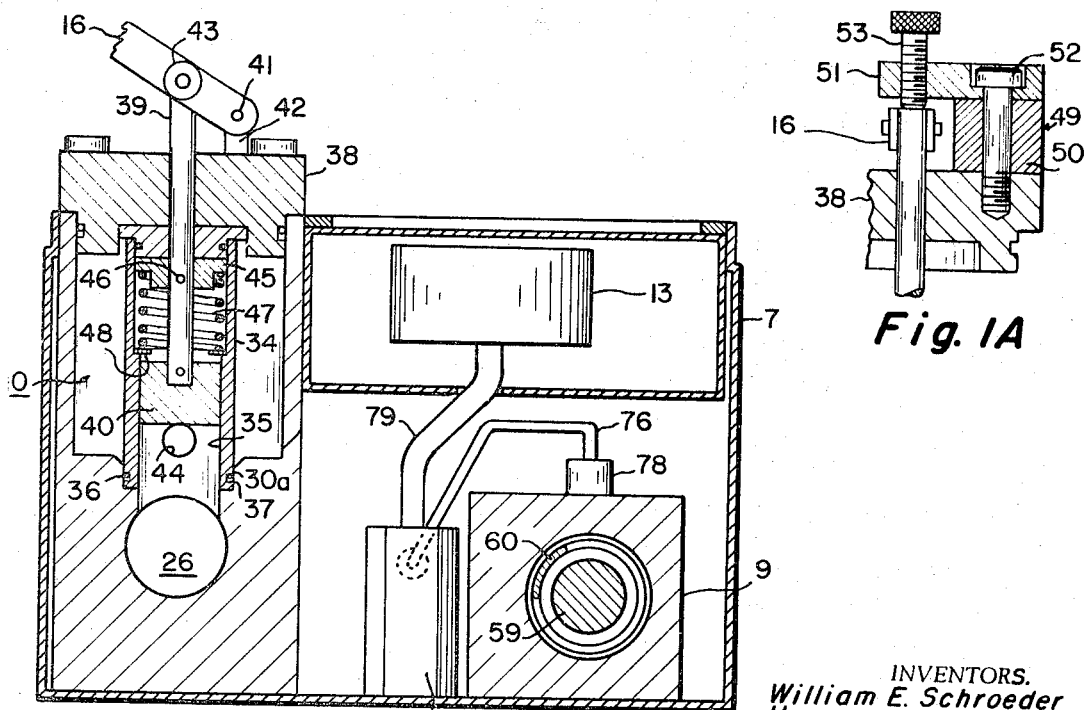
Fig. 4
Fig. 1A
INVENTORS.
William E. Schroeder
Herman F. Holl
BY
THEIR ATTORNEYS Oct. 17, 1967   W. E. SCHROEDER ET AL   3,347,094
HYDRAULIC CIRCUIT TESTER
Filed Oct. 22, 1965   3 Sheets-Sheet 3

INVENTORS.
William E. Schroeder
Herman F. Holl
BY
THEIR ATTORNEYS

United States Patent Office 3,347,094
Patented Oct. 17, 1967

3,347,094
HYDRAULIC CIRCUIT TESTER
William E. Schroeder, Fox Chapel, and Herman F. Holl, Pittsburgh, Pa., assignors to Schroeder Brothers Corporation, McKees Rocks, Pa.
Filed Oct. 22, 1965, Ser. No. 500,766
4 Claims. (Cl. 73—168)

ABSTRACT OF THE DISCLOSURE

A hydraulic tester having a continuous passageway in which an orifice and a loading valve are located. A differential pressure gauge including a spring biased piston adapted to travel in response to fluid pressure is connected across the orifice by means of two smaller passageways. A spring biasing means is secured to one race of a ball thrust bearing and the other race of the ball thrust bearing is seated on the piston. The loading valve includes an adapter including a rotatable arm and an adjustable screw which, in combination with an operating handle of the loading valve, enable the application of a constant load.

---

This application relates to a hydraulic circuit tester and particularly to a portable hydraulic circuit tester by which simultaneous measurement of temperature, pressure, and flow may be made from any outlet port provided in a component of a hydraulic system.

A typical hydraulic system includes a variety of pumps, motors, valves, fluid actuated pistons, and lengths of connecting conduit. It is often necessary to check the condition of the system to determine whether, in fact, the components are performing their functions properly and with the maximum efficiency. The very makeup of a hydraulic system just described suggests the difficulty in testing any one or more of its components in place.

Various portable testers have been introduced to the art, such as that disclosed in U.S. Patent No. 2,924,971. Such testers, however, were vulnerable to damage when they were inadvertently connected to large volumes of fluid and high back pressures and relief valves or blow-out plugs were necessary to protect the instrumentation within the testers. Our tester is an improvement over present testers in that it can be used in circuits where it may encounter volumes in excess of design and high back pressures without requiring relief devices.

We have invented a portable hydraulic tester which is useful in obtaining accurate temperature, pressure, and flow measurements in a large volume, high pressure hydraulic circuit. Specifically, it is virtually indestructible, since it can withstand any probable pressure drop across the orifice and any probable back pressure without any relief device.

In the accompanying drawings, we have shown a preferred embodiment of our invention, in which:

FIGURE 1A is a section through a load adapter used on our tester showing the load adapter in operating positions over the handle of a loading valve.

FIGURE 3 is a section along the lines III—III of FIGURE 1;

FIGURE 4 is a section along the lines IV—IV of FIGURE 1;

Figure 1:
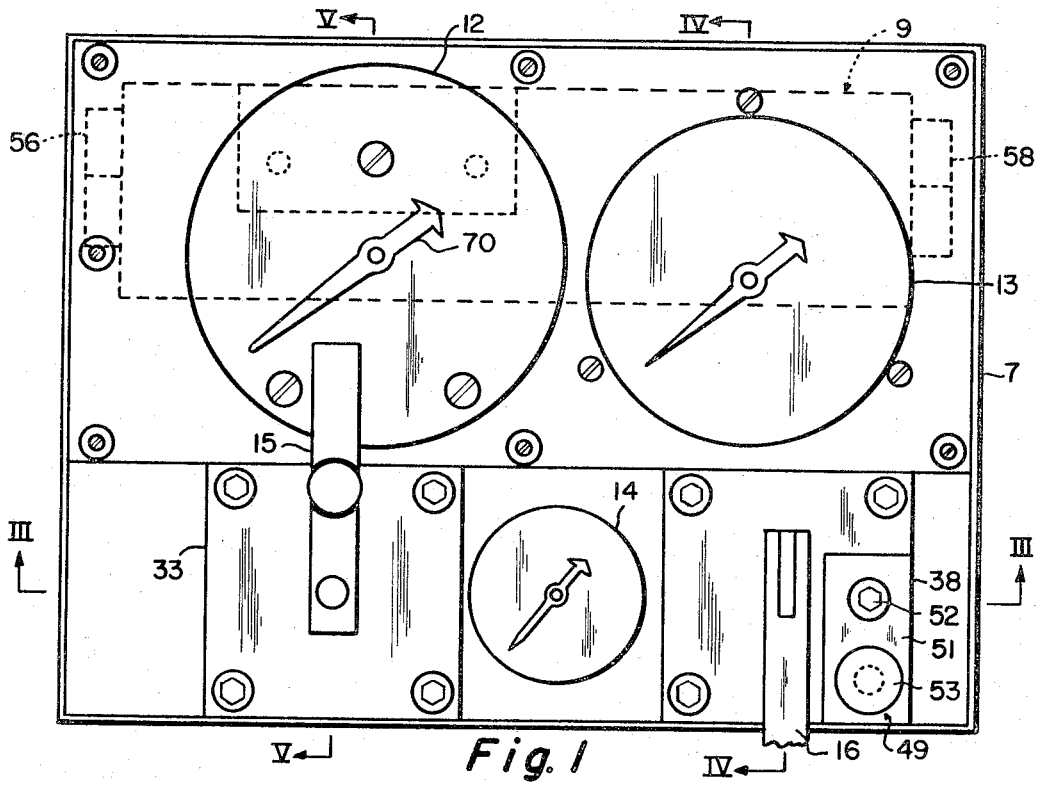
FIGURE 1 is a plan view of our invention with certain portions broken away.
Figure 2:
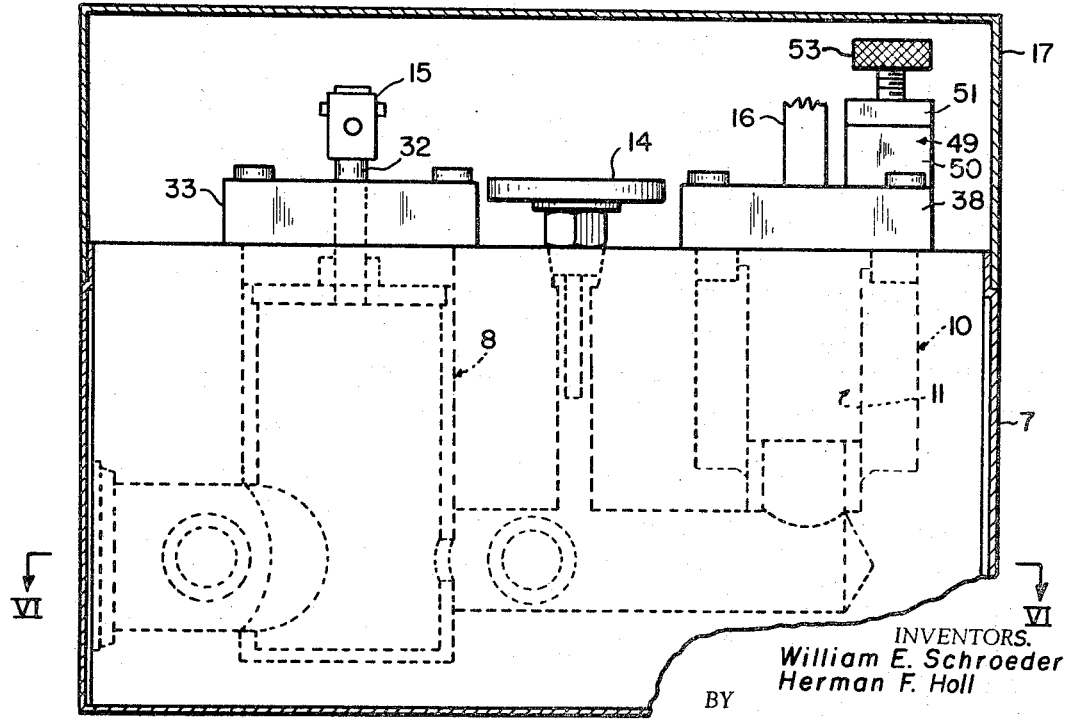
FIGURE 2 is a front elevation of our invention.

Referring to FIGURES 1 and 2, a case 7 encloses the portable hydraulic tester of our invention. Within the case 7 are an orifice selector assembly 8, a flow gauge block 9, and a loading block 10 for housing a manual loading valve 11 (later described) for simultaneously measuring the flow, pressure and temperature of a hydraulic fluid. On the top of the case 7 are a flow gauge 12, a pressure gauge 13, and a temperature gauge 14. The case 7 is covered throughout its entire length and width with a plastic covering having transparent portions directly above these gauges so that the dials thereof may be viewed by the operator.

The operating handles of the orifice selector and the loading valve, at 15 and 16 respectively, are positioned, one on each side of the temperature gauge 14, on top of the covering in position to be grasped by the operator. To protect these handles and dials when the tester is not being used, the case 7 is closed with a cover 17 hinged to the case (hinges not shown).

FIGURE 3 shows the flow of the hydraulic fluid through our testing instrument. Fluid from the component to be tested enters our portable tester through inlet passageway 19. Passageway 19 is threaded at its open end to receive a relatively large pipe (not shown) which provides the inlet to the tester. Immediately within the passageway 19 and extending at right angles to it is the mouth of connecting passageway 20 which leads from passageway 19 through swivel connection 21 to the flow gauge block.

Screen 22 is mounted within the connection 21 at the entrance to the passageway 20. The cross-section of passageway 20 is substantially smaller than the cross-section of the passageway 19, and accordingly, a very small portion of the fluid which enters the tester passes through the screen leading to the measuring instruments in the flow gauge block. The purpose of the screen 22 is to prevent contaminants from entering the block through the passageway 20. Due to its location at the mouth of the passageway 20, most of the fluid flows past the screen in the passageway 19 rather than through it; the high velocity of the fluid passing by the screen, therefore, keeps the particles of dirt in the hydraulic oil from clogging the screen.

The mainstream of the fluid passes from the inlet passageway 19 to an orifice selector assembly 8 through a large opening 23 in the lower portion of the selector chamber 24. One of the three different sized orifices 25 on the opposite wall of the selector chamber from the opening 23 provides exit for the fluid from the selector 8.

The fluid flow continues from the selector into the intermediate passageway 26 downstream from the selector. A small portion of the fluid is diverted into a passageway 27 connected at one end to the intermediate passageway 26 and connected at the opposite end to the flow gauge block. Passageway 27 is parallel to and spaced from the passageway 20; the connections between the passageways 20 and 27 to the inlet and intermediate passageways, respectively, are separated from each other by the orifice selector assembly 8.

Downstream from the connection between the passageway 27 and the intermediate passageway 26 is a vertical passageway 28, of substantially less fluid capacity than passageway 26, connected to the intermediate passageway 26 and seating the temperature gauge 14.

The mainstream or largest amount of the fluid continues from the inlet passageway 19 through the intermediate passageway 26, which extends substantially the entire length of the case 7, and enters the outlet passageway 30 which is connected at right angle to intermediate passageway 26 and extends within the loading block 10. The outlet passageway 30 is threaded to connect to a relatively large discharge pipe (not shown) through which the fluid leaves the tester and returns to the hydraulic system circuit or to the system reservoir.

The main passageways 19, 26 and 30, approximate the size of the pipes in the system connected to the inlet and the outlet of the tester. Moreover, the main passageways are substantially larger and, therefore, have a greater fluid capacity than either of the passageways 20, 27 leading to the flow gauge block, through which some of the fluid is diverted for the purpose of taking pressure measurements. Accordingly, our tester does not create pressure buildup in the systems being tested.

The orifice selector assembly 8 comprises a cylindrical chamber 24. A short shaft 32 secured to the top of the chamber carries the orifice selector handle 15. Cap 33, which journals shaft 32, is bolted to the top of case 7 to maintain the chamber in the proper position between the inlet passageway 19 and the intermediate passageway 26. The lower portion of the selector chamber 24 includes a large inlet opening 23 aligned with the inlet passageway 19 and three different sized openings 25, one of which is aligned with the intermediate passageway 26 by rotation of the selector to provide an orifice across which pressure drop may be measured to determine flow.

As shown in FIGURES 3 and 4, the loading block 10 is at the end of the intermediate passageway 26, downstream from the orifice assembly 8. The lower portion 30a of the outlet passageway 30 is reduced in cross-section. A central sleeve 34 having a bore 35 contains the variable loading valve 11 of the loading block 10. The lower portion of the sleeve 34, which carries an O-ring 36 in a groove 37 to seal against leakage, fits tightly in the reduced portion 30a of the outlet passageway.

Cap 38 retains the upper portion of the sleeve 34 within the outlet passageway 30. A loading valve shaft 39 extends from the loading valve handle 16 vertically through cap 38. A piston 40 connected to the depending end of the shaft 39 is raised and lowered within the bore 35 of the sleeve by movement of the handle 16.

The loading valve handle 16 extending above the top of the case 7 is pivoted at one end on pin 41 which is journaled through clevis stud 42 mounted on the top of cap 38. A washer or disk 43 is attached to handle 16 adjacent the pivot end of the handle and in line with the upper end of shaft 39.

Ports 44 in the lower end of the sleeve provide openings for fluid communication between the bore 35 and the outlet passageway 30 and are adapted to be restricted by the piston 40. A thrust washer 45 is attached by pin 46 to the shaft 39 within the sleeve 34. Coil spring 47 between the washer 45 and a shoulder 48 which protrudes inwardly from the wall of the bore 35 slightly above the raised piston 40 maintains the bottom of the piston 40 above the top of the ports 44 when no load is applied.

To apply a load to the component being tested, the handle 16 is rotated downwardly about its pivot, forcing disk 43 against the top of shaft 39 to move the shaft and its piston 40 downwardly against the spring 47 to restrict the ports 44 in the sleeve 34. It is apparent that the load may be varied by changing the position of the piston 40 within the sleeve 34.

Though the handle 16 may be manually positioned and held to apply the desired load, it is often more practical to free the operator from this duty. Therefore, we have also provided, referring to FIGURE 1A, a screwdown load adapter 49 which includes a block 50 located on one side of the cap 38. Arm 51, which extends outwardly from the block parallel to and spaced from the cap 38, is attached thereto with bolt 52. Arm 51 is adapted to rotate horizontally to engage the free end of the handle 16 between the arm and the cap. An adjusting screw 53 is threaded through the end of the outstanding arm 51 such that the position of the end of the handle 16 may be adjusted vertically between the arm 51 and the cap 38 by turning the screw against the handle 16 to overcome the spring 47, thereby accurately applying a constant load.

Figure 5:
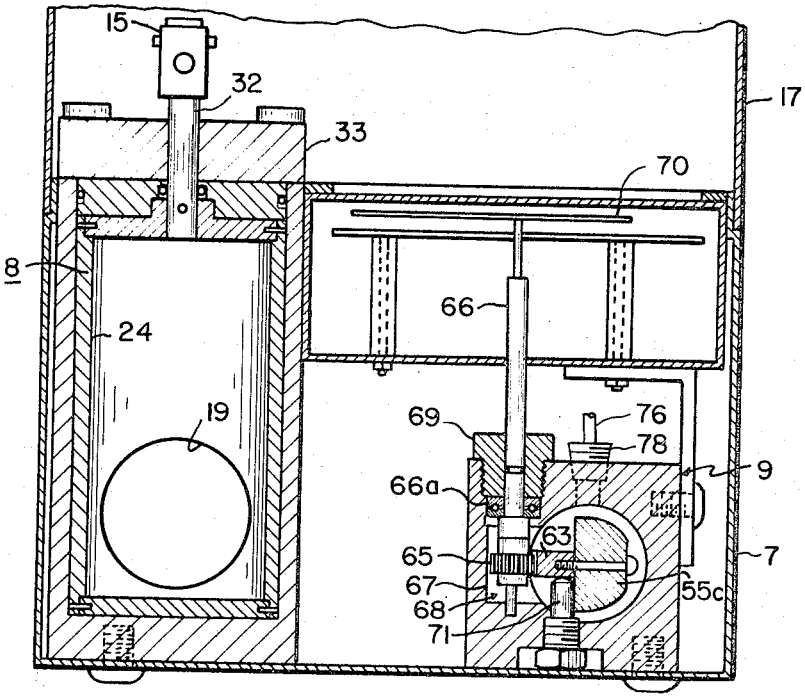
FIGURE 5 is a section along the lines V—V of FIGURE 1.
Figure 6:
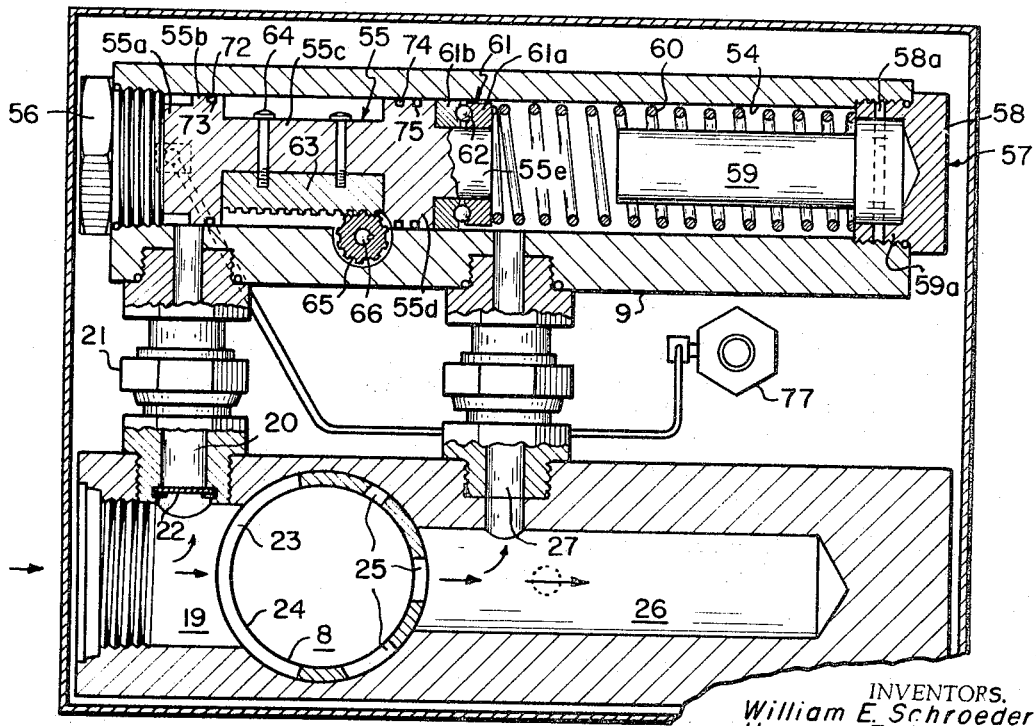
FIGURE 6 is a section along the lines VI—VI of FIGURE 2.

As shown in FIGURES 4–6, flow gauge block 9, which enclose our differential pressure gauge, extends nearly the entire length of the case 7 on the bottom of the case opposite the orifice selector assembly 8. The block 9 includes a bore 54 in which is journaled an elongated piston 55. A plug 56 closes the bore at the upstream pressure end or end nearest the head 55a of the piston 55. A stop assembly 57 threaded into the bore 54 closes the opposite or downstream pressure end. The stop assembly 57 includes a stop 58 to which is secured a stop plug 59, which is a cylindrical shaft extending into the bore 54 and spaced from the sides of the bore. A pin 58a extends through flange 59a of the stop 58 and into the head of the plug 59 to retain the plug. A coil spring 60 surrounds the plug 59 and extends from the base of the flange of the stop 58, where it is secured, around the plug 59 to one half or the outer race 61a of a thrust bearing 61 journaled on the foot 55e of the piston 55. The other half or inner race 61b of the thrust bearing 61 abuts against the lower flange 55d of the piston 55. The foot 55e of the piston 55 is reduced in cross-section relative to the cross-section of the lower flange 55d to form a seat for the races of the thrust bearing 61. A set of ball bearings 62 is rotatably seated between the races 61a and 61b. When the tester is not being used, the head 55a of the piston 55 contacts the plug 56, and the coil spring 60 is slightly compressed between the outer race 61a and flange 59a of the piston stop 58; the piston 55 is retained thereby between the connections of the passageways 20 and 27 with the bore 54 of the block 9.

The passageway 20 leading from the inlet passageway 19 opens into the bore 54 of the flow gauge block 9 on the upstream pressure side of the upper flange 55b of the piston 55. The difference in fluid pressure between the upstream and downstream ends of the piston, that is, the pressure drop across the orifice, causes the piston to travel toward the stop assembly 57, thereby compressing the spring 60. When the fluid pressure differential in the bore is sufficient to fully overcome the spring, the foot of the piston abuts against the stop plug 59.

The central portion 55c of the piston 55, which is the portion between the upper flange 55b and the lower flange 55d, is of reduced cross-section and has flats on both sides. A rack gear 63, the teeth of which face the wall of the bore 54 of the gauge block 9, is secured longitudinally to the surface of the piston 55 by screws 64 within the reduced cross-section. A spur gear 65 secured on a shaft 66 meshes with the rack gear 63. The lower end of shaft 66 extends from the wall 67 of a cavity 68 adjacent the bore of the block. The upper end of shaft 66 includes a thrust bearing 66a and extends upwardly through a plug cap 69. The upper end of shaft 66 is directly connected to a flow gauge pointer 70. A pin 71 extending from the bottom of the block and into the bore 54 of the block abuts against a piston flat to align the rack in mesh with the teeth of the spur gear.

The upper flange 55b of the piston 55 is closely journaled within the bore 54 of the flow gauge block 9. An O-ring 72 which rides in a groove 73 in the piston flange 55b seals the space between the piston flange 55b and the bore of the flow gauge block. A similar seal is also made by O-rings 74 carried by grooves 75 in the lower flange 55d of the piston.

During operation, the spring 60 will compress and return in keeping with the difference in pressure on either end of the piston. Travel of the piston 55 toward and away from the stop plug 59 under the pressure of fluid introduced to the bore 54 turns the spur gear 65 on the rack gear 63 and provides a direct flow reading on the dial 12, since the differential between the upstream pressure and the downstream pressure on the piston determines the travel or distance the piston moves.

The flow gauge block construction just described not only provides a means for direct measurement of flow across the orifice but is, as well, a fail-safe device. In the event that the pressure drop across the orifice is greater than the measuring capacity of the tester, the piston 55 will move to abut against the stop plug 59. When the piston moves toward the stop, the coil spring 60 tends to wind up and must be relieved in order that it may be compressed fully. By securing one end of the spring to the outer race 61a of the thrust bearing 61, the spring is allowed to wind up and full spring compression is obtained. When the spring begins to wind during compression, the outer bearing race 61a rotates on the ball bearings 62 of the thrust bearing 61.

Referring particularly to FIGURE 4, a tube 76 leads from a flow gauge snubber 77, situated within the case 7 adjacent one end of the flow gauge block 9, to the opposite end of the block where the tube joins a pressure gauge connection 78 positioned on top of the block 9 on the upstream pressure end of the piston 55. Gauge connection 78 connects into bore 54 above the piston. Tube 79 secured to the top of the snubber 77 connects the snubber with the pressure gauge 13, a conventional Bourdon tube type gauge. The upstream pressure within the flow gauge block, which is the pressure of the hydraulic system undergoing test, may be read directly on the pressure gauge 13.

From the foregoing, it is apparent that we have invented a portable circuit tested which can be used to measure high fluid pressures and flows and which is indestructible. In our tester, fluid flow is substantially unrestricted since only a small amount of fluid is diverted to pass into the measuring instruments. Accordingly, it is not necessary to filter the bulk of the fluid, reducing the space requirements within the tester. Moreover, our tester incorporates certain safety features not found in even the larger hydraulic circuit testers, particularly, the fail-safe piston-stop differential pressure gauge in the flow gauge block which relieves our tester from the otherwise damaging effects of an overload in fluid flow or pressure.

Our loading valve, which can be manually varied, is spring loaded to remain open as a safety feature. We have further provided a load valve adapter assembly to secure the loading valve handle in the desired position to apply a constant load. Since the cover 17 for the case 7 will not close firmly on the case when the loading valve handle is secured by the adapter arm for constant load application, it is virtually impossible for a damaging volume or pressure overload to occur should an operator connect the tester into the hydraulic system without opening the cover of the case.

Moreover, it will be noted that the operating handle 15 for the variable orifice selector is also secured on its shaft such that when the handle is in the position shown in FIGURE 1, to fit within the cover of the case, the orifice is set for its largest opening.

While we have described a presently preferred embodiment of our invention, it is to be understood that it may be otherwise embodied within the scope of the following claims.

We claim:

1. A hydraulic tester having a case having an inlet and an outlet adapted to be connected into a hydraulic circuit whereby fluid may be passed from the circuit into the tester through the inlet and returned to the circuit from the tester through the outlet, said tester comprising (A) means forming a continuous passageway through the tester and connecting the inlet and the outlet, said passageway having an orifice and a loading valve;

(B) a differential pressure gauge connected across the orifice and having
 (1) a bore closed at both ends;
 (2) a piston within said bore and adapted for travel in response to fluid pressure;
 (3) stop means on the end of said bore nearest the downstream pressure end of the piston for limiting travel of the piston;
 (4) biasing means between the stop means and the downstream pressure end of the piston for urging the piston toward the end of the bore opposite the stop means, said biasing means including a coil spring secured at one end to the stop means and at the opposite end to one race of a ball bearing thrust bearing, the opposing race thereof being rigidly seated on the foot of said piston, whereby full compression of the spring is possible upon rotation of the first bearing;

(C) a first passageway connecting at one end into said continuous passageway between said inlet and said orifice, and connecting at the opposite end into said bore on the upstream pressure end of said piston, said first passageway being substantially smaller in cross-section than said continuous passageway;

(D) a second passageway connecting at one end into said continuous passageway between said orifice and said loading valve, and connecting at the opposite end into said bore on the downstream pressure end of said piston, said second passageway also being substantially smaller in cross-section than said continuous passageway; and (E) means associated with said piston for measuring directly the travel of the piston within the bore whereby the indicated travel of the piston under fluid pressure corresponds to the pressure drop of the fluid across the orifice.

2. A hydraulic tester as described in claim 1 and having means associated with the loading valve for applying a constant load, said valve having an operating handle extending above said case, one end of said handle adapted to be raised and lowered to apply a load, said means comprising a load valve adapter having
 (A) a block secured to said case adjacent said end of said handle;
 (B) an arm rotatably secured to said block and extending outwardly therefrom parallel to and spaced from said case; and
 (C) an adjustable screw threaded through said outwardly extending arm to contact said end of said handle whereby the handle may be adjustably retained between said arm and said case to keep said valve in the desired loaded position.

3. A differential pressure gauge for measuring pressure drop in a hydraulic circuit, a first passageway connected at one end into the circuit at a point of higher pressure and at the other end into the upstream pressure end of the gauge, a second passageway connected at one end into the circuit at a point of lower pressure and at the other end into the downstream pressure end of the gauge, said gauge comprising
 (A) a block having a bore closed at both ends;
 (B) a piston being in said bore and adapted to travel in said bore in response to fluid pressure;
 (C) stop means on one end of said bore for limiting said piston travel;
 (D) a coil spring between said stop means and said piston to bias said piston between the connections of said first and second passageways into said gauge;
 (E) a ball thrust bearing between the piston and the spring having an inner bearing race journaled to the piston and an opposing outer bearing race secured to the end spring opposite to the stop means and a set of ball bearings rotatably mounted between the races whereby under fluid pressure the races rotate relative to each other to permit full compression of the spring; and
 (F) means associated with the piston for measuring the travel of the piston.

4. A hydraulic tester having a case, an inlet and outlet adapted to be connected into a hydraulic circuit whereby fluid may be passed from the circuit into the tester through the inlet and return to the circuit from the tester through the outlet, a continuous passageway through the tester connecting the inlet and outlet in which an orifice and a loading valve are located, a differential pressure gauge connected across the orifice, and an operating handle for the loading valve extending above the case, one end of the handle adapted to be raised and lowered to apply a load, the improvement comprising a load valve adapter having (A) a block secured to said case adjacent said end of said handle;
(B) an arm rotatably secured to said block and extending outwardly therefrom parallel to and spaced from said case; and
(C) an adjustable screw threaded through said outwardly extending arm to contact said end of said handle whereby the handle may be adjustably retained between said arm and said case to keep said valve in the desired loaded position.

References Cited
UNITED STATES PATENTS

| | | | |
|---|---|---|---|
| 2,073,243 | 3/1937 | Liddell et al. | 73—168 X |
| 2,582,146 | 1/1952 | Moore | 73—168 X |
| 2,924,971 | 2/1960 | Schroeder et al. | 73—168 |

LOUIS R. PRINCE, *Primary Examiner.*

J. NOLTON, *Assistant Examiner.*